United States Patent
Wünsche et al.

(10) Patent No.: US 7,103,286 B1
(45) Date of Patent: Sep. 5, 2006

(54) METHOD AND SYSTEM FOR OPTIMIZING THE PULSE FORM OF AN AMPLITUDE MODULATED OPTICAL SIGNAL

(75) Inventors: Ullrich Wünsche, Munich (DE); Walter Pröbster, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,899

(22) PCT Filed: Mar. 1, 2000

(86) PCT No.: PCT/DE00/00630

§ 371 (c)(1),
(2), (4) Date: Sep. 4, 2001

(87) PCT Pub. No.: WO00/52855

PCT Pub. Date: Sep. 8, 2000

(30) Foreign Application Priority Data

Mar. 1, 1999 (DE) .................. 199 08 813

(51) Int. Cl.
*H04B 10/04* (2006.01)

(52) U.S. Cl. ............... 398/198; 398/182; 398/186; 398/195; 398/196; 398/197; 359/245; 359/249; 359/238; 359/276; 372/32; 372/45; 372/50

(58) Field of Classification Search ............... 398/186, 398/182, 183, 195, 198, 196, 197; 359/245, 359/249, 238, 276; 372/32, 45, 50
See application file for complete search history.

(56) References Cited

U.S. PATENT DOCUMENTS

| | | | |
|---|---|---|---|
| 5,629,792 A | | 5/1997 | Masaki |
| 5,726,794 A | * | 3/1998 | Tajima ............... 359/249 |
| 5,742,268 A | * | 4/1998 | Noda ............... 345/84 |
| 6,091,535 A | * | 7/2000 | Satoh ............... 359/239 |

FOREIGN PATENT DOCUMENTS

| | | |
|---|---|---|
| DE | 32 07 741 | 4/1989 |
| DE | 44 42 655 | 7/1996 |
| EP | 0 971 493 | 1/2000 |
| GB | 2 308 675 | 7/1997 |
| GB | 2 316 821 | 3/1998 |

* cited by examiner

*Primary Examiner*—Hanh Phan
(74) *Attorney, Agent, or Firm*—Bell, Boyd & Lloyd LLC

(57) ABSTRACT

The influences on transmission quality caused by chirp and self-phase modulation are at least largely corrected by way of an optimally set operating point of the modulator (2). Suitable criteria are obtained in control loops in order to maintain the optimal setting.

7 Claims, 1 Drawing Sheet

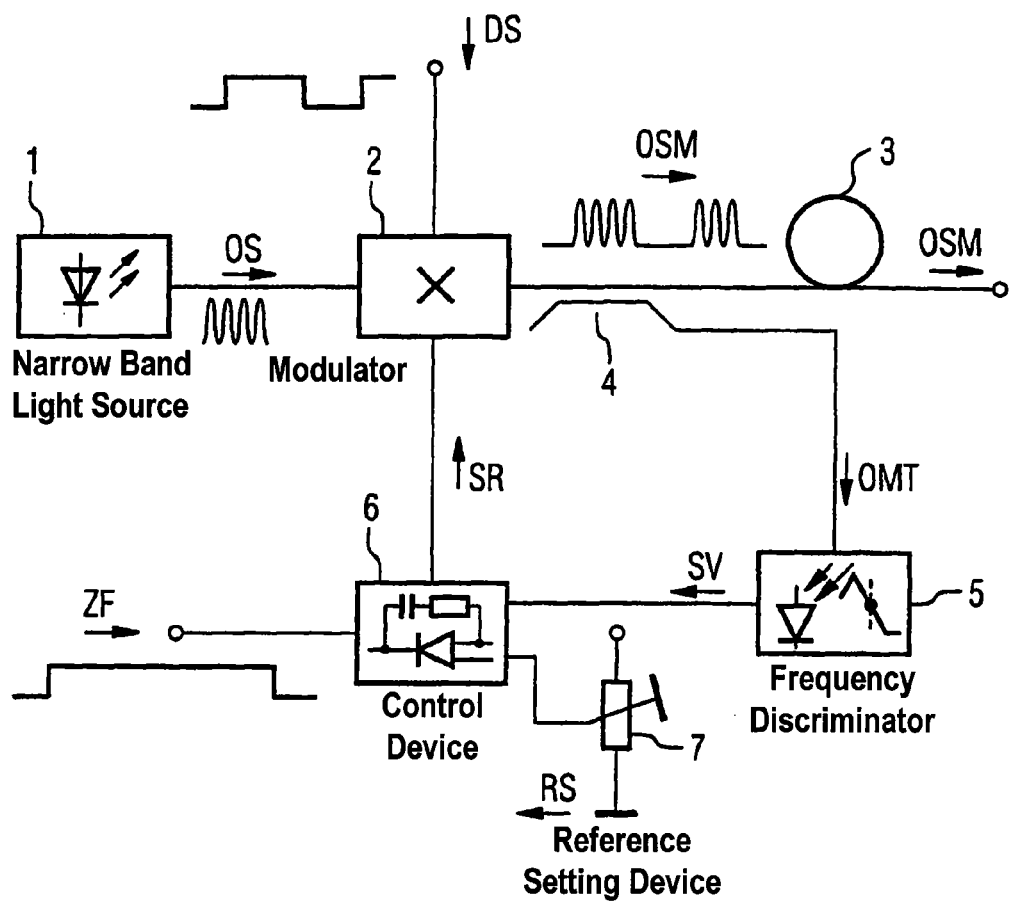
SOLE FIG.

METHOD AND SYSTEM FOR OPTIMIZING THE PULSE FORM OF AN AMPLITUDE MODULATED OPTICAL SIGNAL

BACKGROUND OF THE INVENTION

1. Field of the Invention

The invention relates to a method and arrangement for optimizing an amplitude-modulated optical signal.

2. Description of the Related Art

Digital signals are frequently transmitted in optical networks with the aid of amplitude modulation (ASK). A carrier wave is transmitted in the case of one logic state, and no signal/carrier wave is transmitted during the other logic state. Early in the modulation (on-off), a "chirp" is produced which changes the wavelength and amplitude of the output signal. The transient component of the chirp causes large variations in the edge regions, and a sharp increase or decrease in the wavelength; the switch-on edge is of particular importance since the changes occur in the case of a full signal level. The other adiabatic component of the chirp can be kept small by a suitable design of the modulator.

During transmission of a pulse in a waveguide (glass fiber), self-phase modulation of the carrier occurs (this being a further form of the chirp) in which the wavelength changes likewise, particularly in the leading edge region and trailing edge region of the pulse. Also, amplitude distortions can occur.

The two wavelength distortions, including the transient component of the chirp induced by switching on, and the self-phase modulation result in pulse distortion of the baseband signal, contribute (particularly in the case of transmission systems with high bit rates) to limiting the data rate and the transmission range.

An attempt is usually made to minimize the chirp-induced disturbing influences by setting operating points of Mach-Zehnder modulators or integrated electro-absorption modulators in a test bay. However, resettings must be undertaken when changes occur to the operating parameters.

British patent document GB 2 308 675 A discloses an arrangement and a method for driving an optical modulator and describes the setting of a chirp parameter where monitoring the modulated signal is performed at the receiving end in order to set the chirp parameters via a back channel for pulse compression.

British patent document GB 2 316 821 A describes an optical time-division multiplex system which compensates the chromatic dispersion of the transmission path by means of controlled chirping of the transmitted signal. Monitoring of the modulated signal is not provided.

Earlier European patent application EP 0 971 493 A1 likewise describes a method for compensating dispersion and nonlinearities in optical communication systems. In this system, however, it is, for example, the error rate which is measured and the transmission level which is controlled as parameters. Both measures do not appear to be expedient in modern optical systems.

SUMMARY OF THE INVENTION

It is therefore the object of the invention to provide a method and an arrangement for permanent optimization of the pulse shape/spectral distribution of an amplitude-modulated optical signal, particularly taking omtp account the modulation-induced chirp and the self-phase modulation in optical transmission systems.

Achievements of this object are specified in the independent claims. Advantageous developments of the invention are specified in the subclaims.

This object is achieved by a method for optimizing an amplitude-modulated optical signal, comprising the steps of generating the amplitude-modulated optical signal in a modulator by modulating an optical signal with a digital signal; feeding the amplitude-modulated optical signal to a frequency discriminator which outputs a spectral distribution signal; feeding the spectral distribution signal to a control device which is also fed an adjustable reference signal; and generating a control signal which sets an operating point of the modulator by comparing the adjustable reference signal and the spectral distribution signal. The inventive method may further comprise the step of separating a measuring signal which is fed to the frequency discriminator from the amplitude-modulated optical signal. The method may further comprise the steps of determining the spectral distribution signal at a start of a transmission path; and setting the reference signal based on properties of the transmission path. The method may further comprise the steps of determining the spectral distribution signal at a receiving end; and transmitting the spectral distribution signal or a control signal generated therefrom to the modulator provided at a transmitting end. The control signal may be obtained during periodically occurring time windows.

This object is also achieved by an arrangement for optimizing an amplitude-modulated optical signal, comprising a light source; a modulator having an output, the modulator being fed an optical signal from the light source and a digital signal for amplitude modulation; a frequency discriminator which outputs a spectral distribution signal that is connected to the output of the modulator via a splitter; and a control device with a reference signal setting device which is fed the spectral distribution signal and which generates a control signal which controls an operating point of the modulator. The arrangement may further comprise an adder which is fed the control signal and the digital signal, an adder output being fed to a modulation input of the modulator.

The measures according to the invention consist of using quality criteria for optimal modulation of the optical signal to set the operating point of the modulator and maintaining the optimum setting by way of a control loop.

An advantageous and simple solution is to derive a measuring signal from the modulated optical digital signal and feed it to a frequency discriminator. The output signal of the frequency discriminator is transmitted via a control device which determines the operating point of the modulator.

If the measuring signal is tapped at the receiving end, the properties of the transmission path can be taken into account via an adjustable reference signal. The output signal of the modulator is set so as to produce an optimal received signal.

If a back channel (as a rule, a service channel) is available, a measuring signal can be tapped from the baseband signal and evaluated. The spectral distribution signal output by a phase discriminator, or a control signal generated therefrom, will be transmitted to the source of the signal, i.e., the modulator.

BRIEF DESCRIPTION OF THE DRAWING

The invention is explained in more detail with the aid of an exemplary embodiment. The FIGURE is a schematic block diagram showing a first exemplary embodiment with spectral appraisal.

DETAILED DESCRIPTION OF THE INVENTION

The FIGURE shows a first exemplary embodiment of a control loop for optimizing the modulation-induced chirp. The block diagram shows only the modules essential to the invention. A laser provided as a narrow-band light source 1 supplies an optical signal OS of high frequency, which is fed to a modulator 2. The optical signal is subjected to amplitude modulation by way of a digital signal DS (on-off keying). The modulated optical signal OSM, output by the modulator, is fed into an optical conductor of a transmission path 3 and transmitted. A measuring signal OMT of low power is tapped from the modulated signal via a splitter (coupler) 4 and fed to a frequency discriminator 5. The frequency discriminator can include, for example, an optical filter whose edge, which is as rectilinear as possible, is used for frequency demodulation.

The demodulated optical signal is converted into an electric spectral distribution signal SV and fed to a control device 6. The spectral distribution signal SV is fed as a reference input; an adjustable reference signal RS is generated via a reference setting device 7 (a voltage divider in the example). The control device supplies as a manipulated variable a control signal SR which sets the operating point of the modulator and thereby optimizes the transient chirp of the modulated optical signal even in the case of changes in the component properties.

An optimum setting is given when the receive signal is optimal. A measurement at the receiving end is actually required for this purpose. However, a compact replacement transmission path used for the setting likewise permits an exact setting. The spectral distribution signal serves as a criterion during setting. A specific envelope of the modulated signal corresponds to this criterion, and can likewise serve as a criterion.

If the properties of the transmission path are known, they are already taken into account during setting, and the spectral distribution (or a pulse shape) is set so as to produce optimal receiving conditions.

Since the spectral distribution signal SV can be weakly dependent on the bit sequence of the digital signal, it can be expedient to have a time window ZF during which specific bit sequences are transmitted and the control signal is determined.

The control signal RS and the digital signal can be combined by an adder, and the aggregate signal is then fed to the modulation input of the modulator.

As in the arrangement illustrated in FIG. 1, it is also possible, of course, to appraise the spectral distribution of a modulated optical signal at the receiving end, and a corresponding spectral distribution signal or else the control signal derived therefrom may be provided to the transmitting part.

The above-described method and apparatus are illustrative of the principles of the present invention. Numerous modifications and adaptations will be readily apparent to those skilled in this art without departing from the spirit and scope of the present invention.

LIST OF REFERENCE SYMBOLS

| | |
|---|---|
| DS | Digital signal |
| DD | Demodulated digital signal |
| 1 | Laser |
| 2 | Modulator |
| 3 | Optical conductor |
| 4 | Splitter |
| 5 | Discriminator |
| 6 | Control device |
| 7 | Reference setting device |
| RS | Reference signal |
| OS | Optical signal |
| OSM | Amplitude-modulated optical signal |
| OMT | Measuring signal |
| SV | Spectral distribution signal |
| SF | Control signal |
| ZF | Time window |
| 8 | Summing device |
| 9 | Receiving device |
| 10 | Optoelectric transducer |
| 11 | Amplifier |
| 12 | Decision circuit |
| 13 | Data output |
| 14 | Measuring instrument appraising device |
| 15 | Evaluation device |
| 16 | Controller |
| 17 | Modulation input |
| 18 | Transmitting device |
| 19 | Receiving device |
| SE | Setting signal |

What is claimed is:

1. A method for optimizing an amplitude-modulated optical signal, comprising the steps of:

generating said amplitude-modulated optical signal in a modulator by modulating an optical signal with a digital signal;

feeding said amplitude-modulated optical signal to a frequency discriminator which outputs a spectral distribution signal;

feeding said spectral distribution signal to a control device which is also fed an adjustable reference signal; and generating a control signal which sets an operating point of said modulator by comparing said adjustable reference signal and said spectral distribution signal.

2. The method as claimed in claim 1, further comprising the step of separating a measuring signal which is fed to said frequency discriminator from said amplitude-modulated optical signal.

3. The method as claimed in claim 1, further comprising the steps of:

determining said spectral distribution signal at a start of a transmission path; and setting said reference signal based on properties of said transmission path.

4. The method as claimed in claim 1, further comprising the steps of:

determining said spectral distribution signal at a receiving end; and transmitting said spectral distribution signal or a control signal generated therefrom to said modulator provided at a transmitting end.

5. The method as claimed in claim 1, wherein said control signal is obtained during periodically occurring time windows.

6. An arrangement for optimizing an amplitude-modulated optical signal, comprising:
   a light source;
   a modulator having an output, said modulator being fed an optical signal from said light source and a digital signal for amplitude modulation;
   a frequency discriminator which outputs a spectral distribution signal that is connected to said output of said modulator via a splitter; and
   a control device with a reference signal setting device which is fed said spectral distribution signal and which generates a control signal which controls an operating point of said modulator.

7. The arrangement as claimed in claim 6, further comprising an adder which is fed said control signal and said digital signal, an adder output being fed to a modulation input of said modulator.

* * * * *